(12) United States Patent
Negishi et al.

(10) Patent No.: US 10,586,568 B2
(45) Date of Patent: Mar. 10, 2020

(54) MAGNETIC DATA PROCESSING DEVICE AND MAGNETIC DATA PROCESSING METHOD

(71) Applicant: NIDEC SANKYO CORPORATION, Nagano (JP)

(72) Inventors: Akihiro Negishi, Nagano (JP); Tsutomu Baba, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 16/335,014

(22) PCT Filed: Sep. 22, 2017

(86) PCT No.: PCT/JP2017/034187
§ 371 (c)(1),
(2) Date: Mar. 20, 2019

(87) PCT Pub. No.: WO2018/062000
PCT Pub. Date: Apr. 5, 2018

(65) Prior Publication Data
US 2019/0251994 A1 Aug. 15, 2019

(30) Foreign Application Priority Data
Sep. 30, 2016 (JP) ................. 2016-194081

(51) Int. Cl.
*G11B 5/80* (2006.01)
*G11B 20/10* (2006.01)
(Continued)

(52) U.S. Cl.
CPC ........ *G11B 20/10268* (2013.01); *G06F 21/60* (2013.01); *G06F 21/602* (2013.01);
(Continued)

(58) Field of Classification Search
CPC . G11B 5/80; G11B 20/18; H04N 7/18; H04N 21/4431; H04N 21/84;
(Continued)

(56) References Cited

U.S. PATENT DOCUMENTS

2010/0265617 A1* 10/2010 Isuyama ................ G06K 7/084
360/123.01

FOREIGN PATENT DOCUMENTS

JP 2000011099 A 1/2000
JP 2003099903 A 4/2003
(Continued)

OTHER PUBLICATIONS

International Search Report corresponding to Application No. PCT/JP2017/034187; dated Dec. 26, 2017.

*Primary Examiner* — Nabil Z Hindi
(74) *Attorney, Agent, or Firm* — Cantor Colburn LLP

(57) ABSTRACT

A magnetic data processing device may include an encryption magnetic head structured to read the magnetic data recorded on the medium. The encryption magnetic head may include a magnetic data reading part structured to read the magnetic data of the medium to output an analog output signal; a demodulation electronic component structured to demodulate the analog output signal outputted from the magnetic data reading part to generate a digital demodulated signal; and an encryption electronic component structured to generate an encrypted signal obtained by encrypting the demodulated signal demodulated by the demodulation electronic component. The encryption electronic component may include at least a first buffer, a second buffer and a third buffer structured to store data having been read at an insertion time and an ejection time of the medium.

3 Claims, 6 Drawing Sheets

(51) Int. Cl.
  *G06K 7/08* (2006.01)
  *G06F 21/60* (2013.01)
  *G06F 21/80* (2013.01)
  *G11B 5/09* (2006.01)
  *G11B 5/02* (2006.01)

(52) U.S. Cl.
  CPC ............ *G06F 21/80* (2013.01); *G06K 7/084* (2013.01); *G11B 5/02* (2013.01); *G11B 5/09* (2013.01); *G11B 20/10* (2013.01)

(58) Field of Classification Search
  CPC ........... H04N 21/44008; H04N 21/278; H04N 21/23418; H04N 21/23109; G08B 13/19613; G08B 13/19656
  USPC ...... 360/2, 53, 137; 235/493, 375, 379, 487, 235/492, 449; 705/41; 380/25, 23, 2, 3, 380/4
  See application file for complete search history.

(56) References Cited

FOREIGN PATENT DOCUMENTS

| | | | |
|---|---|---|---|
| JP | 2003317202 A | 11/2003 | |
| JP | 2009076172 A | 4/2009 | |
| JP | 2011040140 A | 2/2011 | |
| JP | 2011215748 A | 10/2011 | |

\* cited by examiner

MAGNETIC DATA PROCESSING DEVICE AND MAGNETIC DATA PROCESSING METHOD

CROSS REFERENCE TO RELATED APPLICATIONS

This is the U.S. national stage of application No. PCT/JP2017/034187, filed on Sep. 22, 2017. Priority under 35 U.S.C. § 119(a) and 35 U.S.C. § 365(b) is claimed from Japanese Application No. 2016-194081, filed Sep. 30, 2016; the disclosures of which are incorporated herein by reference.

TECHNICAL FIELD

At least an embodiment of the present invention relates to a magnetic data processing device and a magnetic data processing method in which magnetic data recorded on a medium such as a card are processed.

BACKGROUND

Conventionally, as a magnetic data processing device, a card reader has been known which is structured to read magnetic data recorded on a card by a magnetic head disposed in a card conveyance passage where the card is conveyed. Further, in an industry where a card reader is utilized, conventionally, so-called skimming, that is, a criminal attaches a signal line to a magnetic head to illegally acquire magnetic information of a card, has become a serious issue.

Therefore, conventionally, a magnetic head capable of preventing the skimming has been proposed (see, for example, Patent Literature 1). In the magnetic head described in Patent Literature 1, terminals of the magnetic head and one end of a flexible cable are connected with each other in an inside of a head case of the magnetic head. Further, the other end of the flexible cable is connected with one face of a circuit board in the inside of the head case. A demodulation IC for demodulating an output signal from the terminals of the magnetic head is mounted on the one face of the circuit board, and a CPU for encrypting a demodulated signal from the demodulation IC is mounted on the other face of the circuit board. The circuit board is fixed to the head case so that the demodulation IC is disposed in the inside of the case body and the CPU is disposed on an outer side of the case body.

Further, as a card reader, a manual type card reader has been known in which, when a user manually inserts a card into an inside of the card reader or, when an inserted card is ejected from the inside of the card reader, reading or the like of magnetic data is performed (see, for example, Patent Literature 2).

Patent Literature

[PTL 1] Japanese Patent Laid-Open No. 2011-040140
[PTL 2] Japanese Patent Laid-Open No. 2003-99903

However, in a case that a magnetic head as described in Patent Literature 1 is mounted on a manual type card reader described in Patent Literature 2, magnetic data at an insertion time are going to be encrypted, a time for encryption key exchange and data encryption processing is required. Therefore, a reading start at an ejection time is delayed and, when an ejecting operation is performed quickly, there is a problem that a risk of occurrence of a reading error is increased.

SUMMARY

In view of the problem described above, at least an embodiment of the present invention provides a magnetic data processing device in which a user manually operates a card and the like to process magnetic data recorded on the card and which is capable of achieving both security performance and reading performance. Further, at least an embodiment of the present invention provides a magnetic data processing method in which a user manually operates a card and the like to process magnetic data recorded on the card and which is capable of achieving both security performance and reading performance.

A magnetic data processing device in accordance with at least an embodiment of the present invention is a magnetic data processing device in which a medium recorded with magnetic data is manually operated by a user, and the magnetic data are read when the medium is inserted into an inside of the device or, when the medium having been inserted is ejected from the device. The magnetic data processing device includes an encryption magnetic head structured to read the magnetic data recorded on the medium. The encryption magnetic head includes a magnetic data reading part which reads the magnetic data of the medium to output an analog output signal, a demodulation electronic component which demodulates the analog output signal outputted from the magnetic data reading part to generate a digital demodulated signal, and an encryption electronic component which generates an encrypted signal obtained by encrypting the demodulated signal demodulated by the demodulation electronic component. The encryption electronic component includes at least a first buffer, a second buffer and a third buffer structured to store data having been read at an insertion time and an ejection time of the medium. According to this structure, even in a structure that the encryption magnetic head is used, reading can be performed so that an inserting and pulling-out operation is performed quickly compared with the conventional and both security performance and reading performance can be attained.

In the magnetic data processing device in accordance with at least an embodiment of the present invention, the encryption electronic component includes the first buffer which stores data having been read at the insertion time and the ejection time of the medium and demodulated, the second buffer which stores data obtained by decoding the data having been read either at the insertion time or the ejection time of the medium and demodulated, and the third buffer which stores data obtained by decoding the data having been read either at the insertion time or the ejection time of the medium and demodulated and other than the data stored in the second buffer. According to this structure, a delay time of reading can be reduced.

A magnetic data processing method in accordance with at least an embodiment of the present invention is a magnetic data processing method executed by a magnetic data processing device in which a medium recorded with magnetic data is manually operated by a user and the magnetic data are read when the medium is inserted into an inside of the device or, when the medium having been inserted is ejected from the device, and the magnetic data processing device includes an encryption magnetic head structured to read the magnetic data recorded on the medium. The magnetic data processing method includes, by the encryption magnetic head, reading the magnetic data of the medium and outputting an analog output signal, demodulating the analog output signal having been outputted and generating a digital demodulated signal, storing the digital demodulated signal having been read at an insertion time of the medium in a second buffer and storing the digital demodulated signal having been read at an ejection time in a first buffer, storing the digital demodulated signal having been read at the insertion time of the medium in the second buffer, decoding the demodulated signal having been demodulated, storing decoded data of the demodulated signal having been read at the insertion time of the medium in the second buffer, and storing decoded data of the demodulated signal having been read at the ejection time of the medium in a third buffer. When structured as described above and, when both are compared and the normal data are encrypted to generate the final encryption data, even in a structure using the encryption magnetic head, an inserting and pulling-out operation can be performed quickly compared with the conventional, and both security performance and reading performance can be attained.

According to at least an embodiment of the present invention, since completion of reading of magnetic data at the insertion time of the medium is detected, even in a structure that the encryption magnetic head is used, reading can be performed in a state that an inserting and pulling-out operation is performed quickly compared with the conventional, and thus the magnetic data processing device in which both security performance and reading performance are attained can be provided.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

At least an embodiment of the present invention will be described below with reference to the accompanying drawings.

Embodiment

[Schematic Structure of Card Reader 1]

Figure 1:
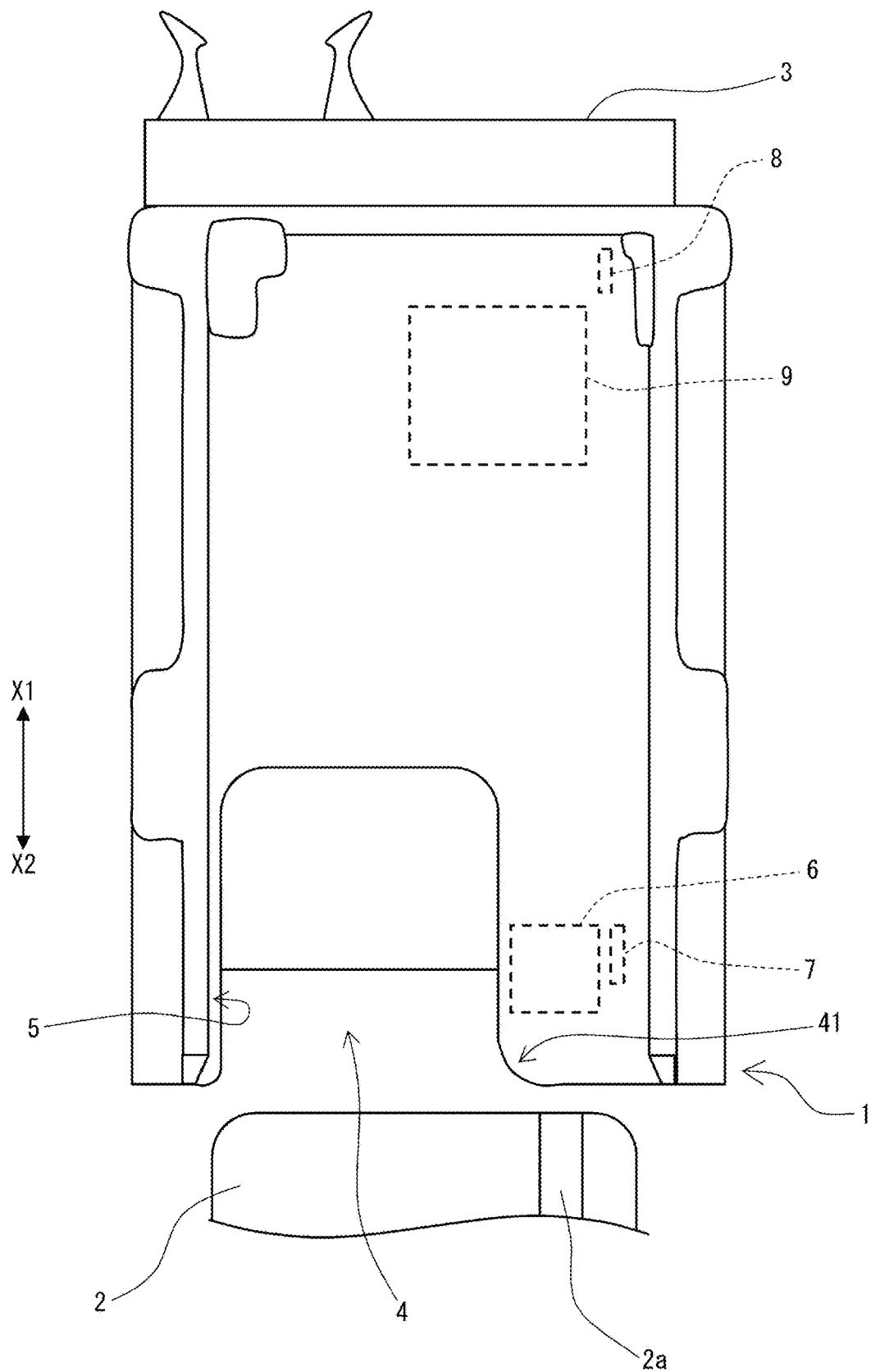
FIG. 1 is an explanatory plan view showing a schematic structure of a card reader in accordance with an embodiment of the present invention.
Figure 2:
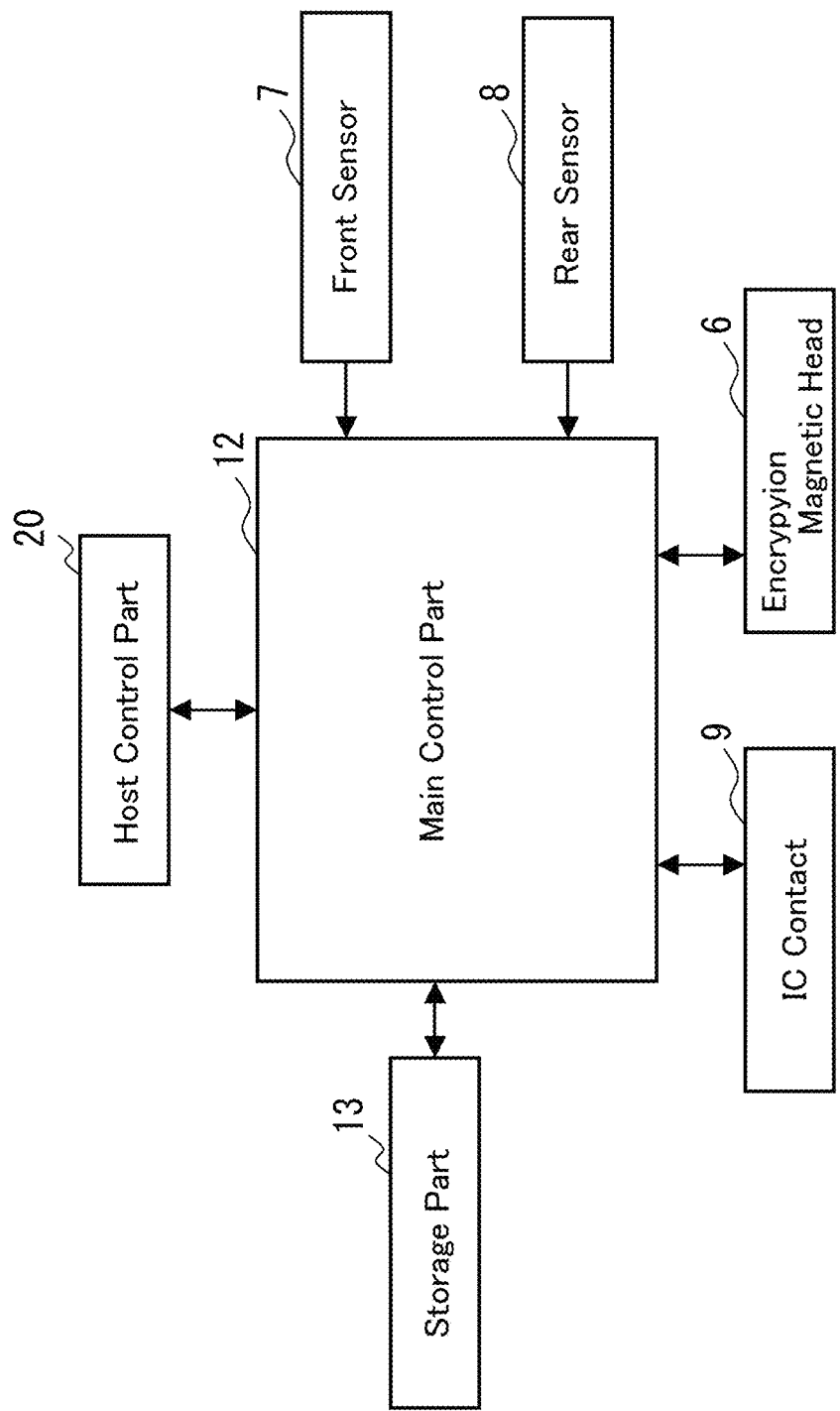
FIG. 2 is a block diagram showing a structure of respective parts associated with a main control part of the card reader shown in FIG. 1.

FIG. 1 is an explanatory plan view showing a schematic structure of a card reader 1 in accordance with an embodiment of the present invention. FIG. 2 is a block diagram showing a structure of respective parts associated with a control part of the card reader 1 shown in FIG. 1.

A card reader 1 in this embodiment is an example of a manual type magnetic data processing device in which a card 2 is manually operated by a user and magnetic data recorded on the card 2 are read by an encryption magnetic head 6 disposed in a card conveyance passage where the card 2 is conveyed. Specifically, the card reader 1 is a so-called dip type card reader in which magnetic data of a card 2 are read by an encryption magnetic head 6 when the card 2 is manually inserted into an inside of the device of the card reader 1 or, when the card 2 having been inserted into the inside of the device of the card reader 1 is manually ejected. The card reader 1 in this embodiment is mounted on a host apparatus such as an ATM and is used.

In this embodiment, a card 2 is inserted in the "X1" direction shown in FIG. 1 and the like and the card 2 is ejected in the "X2" direction. In other words, the "X1" direction is an inserting direction of a card 2. Further, the "X1" direction side is a rear side in the inserting direction of a card 2 and the "X2" direction side is a front side in the inserting direction of the card 2. Therefore, in the following descriptions, the "X1" direction side is referred to as a "rear" side and the "X2" direction side is referred to as a "front" side.

A card 2 is, for example, a rectangular card made of vinyl chloride whose thickness is about 0.7-0.8 mm. A surface of the card 2 is formed with a magnetic stripe 2a in which magnetic data are recorded. Further, the card 2 may be provided with an IC chip (not shown). The card 2 may be formed with a magnetic stripe 2a without providing an IC chip and, alternatively, the card 2 may be provided with an IC chip without forming a magnetic stripe 2a. Further, a communication antenna may be incorporated in the card 2. Further, a surface of the card 2 may be formed with a printing part on which printing is performed by a thermal method or the like. In addition, the card 2 may be a PET (polyethylene terephthalate) card whose thickness is about 0.18-0.36 mm, or a paper card having a predetermined thickness.

The card reader 1 includes, as shown in FIG. 1, an encryption magnetic head 6 structured to read magnetic data recorded on a magnetic stripe 2a of a card 2 and an IC contact 9. A card passage 5 where a card 2 inserted through a card insertion port 4 is passed is formed in a straight line shape in an inside of the device of the card reader 1. Further, the card reader 1 includes a front sensor 7 (front detection mechanism) and a rear sensor 8 (rear detection mechanism) as a card detection part for detecting a card 2 having been inserted into the inside. A housing 3 is structured of a holding member which holds respective parts and a circuit board (not shown). The circuit board is connected with the front sensor 7 and the rear sensor 8 and includes various circuits for acquiring signals from the encryption magnetic head 6 and the IC contact 9 and controlling the respective parts. The various circuits include a main control part 12 (FIG. 2) for controlling the card reader 1.

Further, a part on a front end side of the card reader 1 is, as shown in FIG. 1, formed with a cut-out part 41 so that a user is capable of inserting a card 2 and ejecting (pulling out) the card 2. Therefore, a part of the card 2 having been inserted to a rear end side of the card reader 1 is exposed in the cut-out part 41. Further, a front end of the card passage 5 is a card insertion port 4. In other words, the card passage 5 is formed so as to be connected with the card insertion port 4. The encryption magnetic head 6 is disposed on a front end side of the card reader 1. Further, the encryption magnetic head 6 is disposed on a lower side with respect to the card passage 5 in FIG. 1. The IC contact 9 is disposed on a rear end side of the card reader 1. Further, the IC contact 9 is disposed on an upper side with respect to the card passage 5 in FIG. 1.

The front sensor 7 is disposed on the front end side of the card reader 1. The front sensor 7 functions as a card detection part for detecting a card 2 having been inserted through the card insertion port 4. Further, the front sensor 7 is disposed on the card insertion port 4 side (front end side) of the card reader 1 and, normally, functions as a first detection part structured to detect a card 2 having been inserted through the card insertion port 4. In this embodiment, the front sensor 7 is, for example, a mechanical and optical detection means including a sensor plate which is a contact member and a light emitting element and a light receiving element for detecting displacement of the sensor plate, or the like.

The rear sensor 8 is disposed on the rear end side of the card reader 1. The rear sensor 8 functions as a card detection part which detects a card 2 having been inserted into the rear end side of the card reader 1. In other words, the rear sensor 8 normally detects that a tip end of a card 2 reaches the rear end side of the card passage and the card 2 is stopped at a card stopping position. Further, the rear sensor 8 functions as a second detection part which is disposed on a rear side in the inserting direction of a card 2 with respect to the front sensor 7. In this embodiment, the rear sensor 8 is, similarly to the front sensor 7, for example, a mechanical and optical detection means including a sensor plate which is a contact member and a light emitting element and a light receiving element for detecting displacement of the sensor plate, or the like.

Further, as shown in FIG. 2, the encryption magnetic head 6 and the IC contact 9 are connected with a main control part 12. Further, the main control part 12 is connected with the front sensor 7 and the rear sensor 8, and an output signal from the front sensor 7 and an output signal from the rear sensor 8 are inputted to the main control part 12. In addition, the main control part 12 is connected with a host control part 20 which controls a host apparatus (not shown) on which the card reader 1 is mounted. The control part in this embodiment is a control means which controls the card reader 1, and the host control part 20 is a host control means which controls the host apparatus. The respective parts are connected through communication lines such as various buses and signal lines.

Further, the main control part 12 integrally controls the entire card reader 1 and controls reading of a signal by using the encryption magnetic head 6 and writing of data through the IC contact. The main control part 12 is structured of a CPU (Central Processing Unit), an MPU (Micro Processing Unit) or the like. The main control part 12 exchanges an encryption key 230 (FIG. 4) stored in a storage part 13 with the encryption magnetic head 6 and receives magnetic data of a card 2 encrypted in the encryption magnetic head 6. In this case, the main control part 12 is capable, for example, of transmitting magnetic data in an encrypted state to the host control part 20. In this embodiment, magnetic data in the encrypted state may be an encrypted character code. Further, the main control part 12 transmits encrypted magnetic data to write on a card 2 through the encryption magnetic head 6. Further, the main control part 12 judges an insertion state of a card 2, completion of reading and writing based on signals of the front sensor 7 and the rear sensor 8.

The storage part 13 is a non-transitory recording medium for the main control part 12 which is accessed by the main control part 12. The storage part 13 includes a RAM (Random Access Memory) and a ROM (Read Only Memory) which are working areas of the main control part 12. Further, the storage part 13 may include a flash memory or an HDD (Hard Disk Drive). The storage part 13 is stored with various programs including a control program for the main control part 12 executed by the main control part 12 and data. The control program for the main control part 12 includes processings of monitoring the front sensor 7 and the rear sensor 8, transmitting of an instruction (command) of reading start to an encryption control part 62, and the like. The control program for the main control part 12 may include processing for reading and writing in an IC card. Further, the storage part 13 stores the encryption key 230 (FIG. 4) including a public key and a secret key for encrypting magnetic data to transmit to and receive from the encryption magnetic head 6.

The host control part 20 may include a communication control part (not shown) which is an interface for connecting the card reader 1 with the host apparatus provided in an ATM main body. The communication control part includes interfaces such as USB (Universal Serial Bus), RS-232C, parallel, LAN (Local Area Network) for communicating with the host apparatus.

Further, as described below, in this embodiment, a state of insertion of a card 2 based on the front sensor 7 and the rear sensor 8 can be detected only by the main control part 12 (FIG. 2). On the other hand, the encryption magnetic head 6 autonomously determines reading completion of a card 2 based on a reading state of magnetic data as described below.

[Structure of Encryption Magnetic Head 6]

Figure 3:
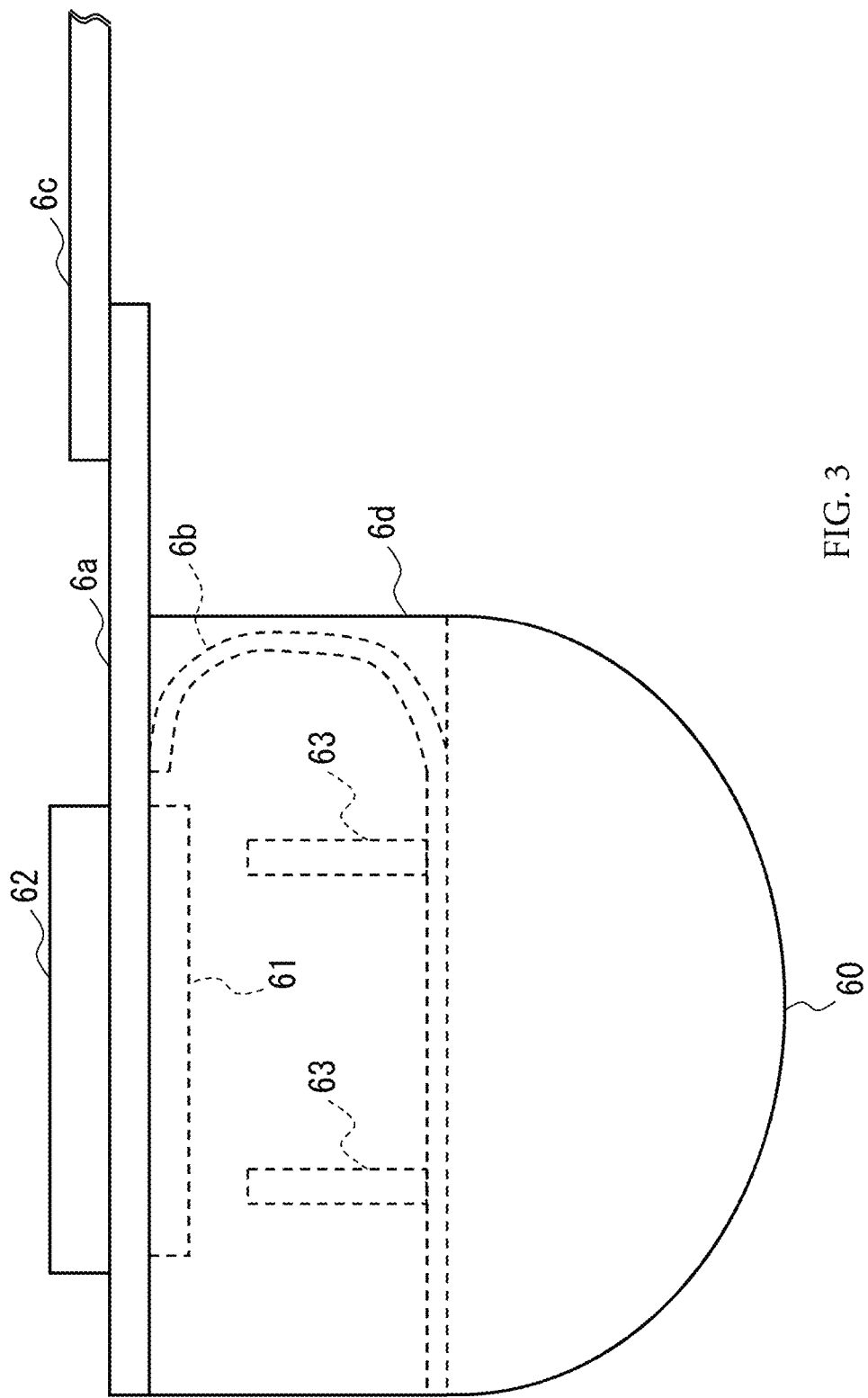
FIG. 3 is an explanatory side view showing a schematic structure of an encryption magnetic head shown in FIG. 1.
Figure 4:
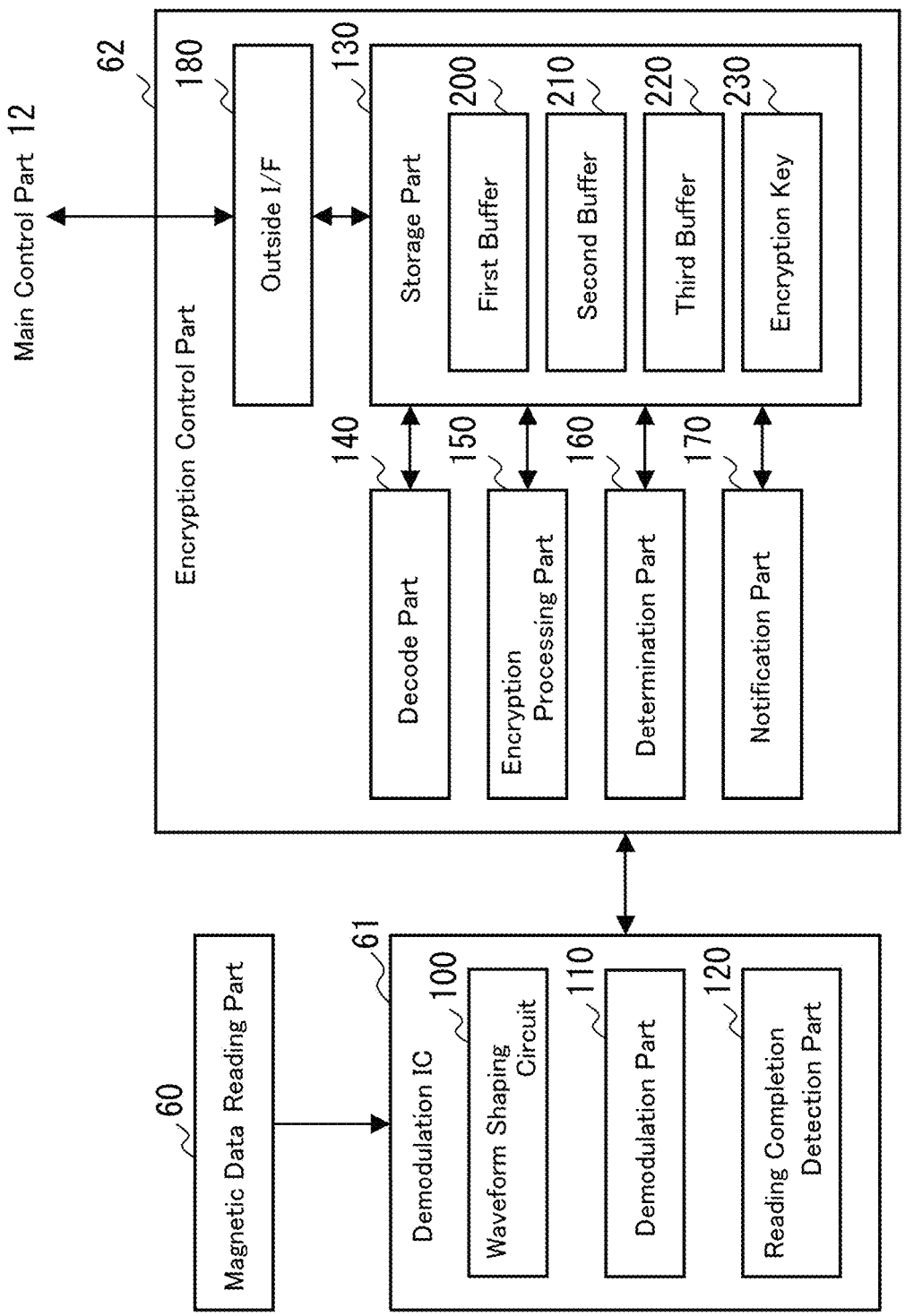
FIG. 4 is a block diagram showing a control structure of an encryption magnetic head shown in FIG. 1.
Figure 5:
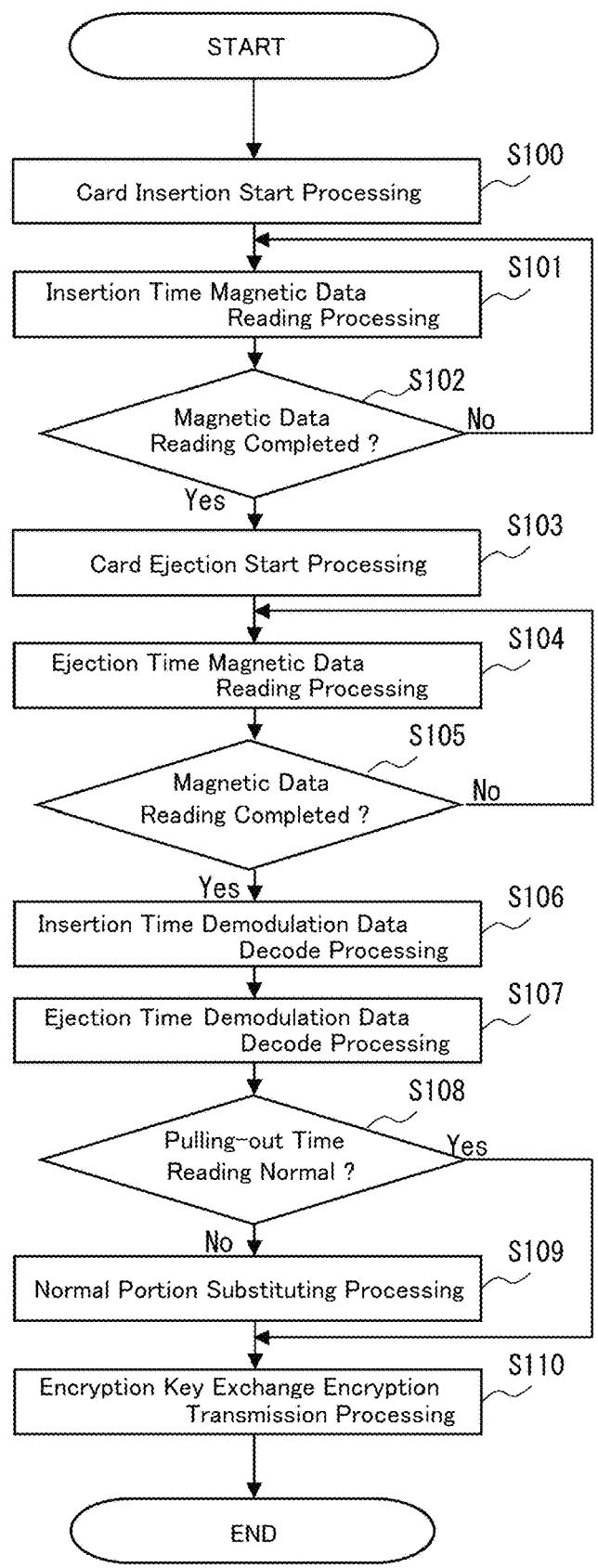
FIG. 5 is a flow chart showing card reading processing in accordance with an embodiment of the present invention.

FIG. 3 is an explanatory side view showing a schematic structure of the encryption magnetic head 6 in accordance with this embodiment. FIG. 4 is a block diagram showing a control structure of the encryption magnetic head 6 in accordance with this embodiment. FIG. 4 also shows an electrical connected relation between the encryption magnetic head 6 and the card reader 1.

The encryption magnetic head 6 is an encryption magnetic head on which a magnetic stripe 2a of a card 2 is slid and which is mounted with a function that magnetic signals of respective tracks of the magnetic stripe 2a are read as magnetic data and the magnetic data having been read are encrypted. A detailed control structure of the encryption magnetic head 6 will be described below.

Further, as shown in FIG. 3, the encryption magnetic head 6 is structured so that a circuit board 6a on which a demodulation IC 61 and the encryption control part 62 are mounted is mounted on a case body 6d in which a magnetic data reading part 60 is accommodated. Further, the encryption magnetic head 6 includes a flexible cable 6b which electrically connects signal terminals 63 of the magnetic data reading part 60 with the demodulation IC 61 mounted on the circuit board 6a. The demodulation IC 61 and the encryption control part 62 are, for example, formed in a flat rectangular parallelepiped shape. The circuit board 6a is connected with the main control part 12 (FIG. 1) through a cable 6c. The magnetic data reading part 60, the demodulation IC 61, the signal terminals 63 and the flexible cable 6b are accommodated inside the case body 6d of the encryption magnetic head 6. Further, the magnetic data reading part 60 is fixed to a lower end side of the case body 6d.

Further, as shown in FIG. 4, the encryption magnetic head 6 includes, as a circuit structure, the magnetic data reading part 60, the demodulation IC 61 and the encryption control part 62 (encryption CPU).

The magnetic data reading part 60 is structured so as to read magnetic data. The magnetic data reading part 60 includes, for example, a magnetic head which is capable of reading magnetic data of three tracks recorded in a magnetic stripe 2a of a card 2. The magnetic head is structured of a magnetic core formed with a magnetic gap for reading magnetic data and a coil which is wound around the magnetic core. Further, end parts of the coil wound around the magnetic core are connected with one end sides of the signal terminals 63.

A magnetic signal of the magnetic stripe 2a or the like of the card 2 read by the magnetic data reading part 60 is outputted as an analog output signal from the signal terminals 63 to the demodulation IC 61.

The demodulation IC 61 is a circuit such as a magnetic signal processing IC (Integrated Circuit) structured to perform processing in which an analog-shaped output signal outputted from the signal terminals 63 of the magnetic data reading part 60 is demodulated to generate (encode) a digital-shaped demodulated signal and other processings. In other words, the demodulation IC 61 in this embodiment is a demodulation electronic component structured to demodulate an analog-shaped output signal outputted from the signal terminal 63 to generate a digital-shaped demodulated signal.

Further, as shown in FIG. 4, the demodulation IC 61 in this embodiment includes a waveform shaping circuit 100, a demodulation part 110 and a reading completion detection part 120.

The waveform shaping circuit 100 is, for example, a circuit which includes an amplifier, a bandpass filter, a differential circuit, a comparator and the like. The waveform shaping circuit 100 amplifies an analog signal outputted from the signal terminals 63 of the magnetic data reading part 60, detects peak values to generate a rectangular wave, and outputs the rectangular wave to the demodulation part 110. More specifically, a signal waveform of an analog signal obtained from the encryption magnetic head 6 is exhibited as positive and negative peaks at rising and falling time points of a recorded electric current waveform. In other words, positive and negative peaks are exhibited at inversion positions of magnetic polarity of recorded data which are recorded magnetically. The analog signal waveform is supplied to the waveform shaping circuit 100 and peak positions are distinguished.

The demodulation part 110 demodulates the rectangular wave outputted from the waveform shaping circuit 100. Specifically, the demodulation part 110 acquires a digital signal waveform corresponding to a magnetic signal acquired by the magnetic head, which corresponds to a recording electric current waveform in the "F2F" (Two Frequency Coherent Phase Encoding) system in which data and a clock are combined and recorded in the same track of the magnetic stripe 2a. In other words, the demodulation part 110 converts a rectangular wave outputted from the waveform shaping circuit 100 into binary data (demodulated signal) of "0" or "1" by frequency modulation. The demodulation part 110 uses, for example, "F2F" demodulation as the frequency modulation system. In this case, the demodulation part 110 converts into "F" or "0" in a case that no peak is existed in a predetermined time period and, in a case that a peak is existed, the demodulation part 110 converts into "2 F" or "1". The demodulation part 110 temporarily stores the binary data demodulated as described above in a reading data buffer (not shown). More specifically, a recording electric current waveform for magnetic recording is composed of a pulse signal of a frequency "F" and a pulse signal of a frequency "2F". The binary data "0" is defined by a pulse signal of a low frequency "F", and the binary data "1"

is defined by a pulse signal of a high frequency "2F". Therefore, successive binary data of (000010 . . . ) are expressed. The demodulation part 110 stores the binary data in a first buffer 200 of the storage part 130, for example, by DMA (Direct Memory Access). The "F2F" (Two Frequency Coherent Phase Encoding) recording system is a system frequently used in a common digital recording, and the recording system is currently used in most of magnetic cards.

The reading completion detection part 120 detects completion of reading of magnetic data at the time of insertion of a card 2 and at the time of pulling-out (ejection) of the card 2. In this embodiment, the reading completion detection part 120 determines that reading of magnetic data is completed when magnetic data from the magnetic data reading part 60 is not detected during a specific time period. The reading completion detection part 120 outputs a signal indicating the completion to the encryption control part 62 when it is determined that the reading has been completed. The reading completion detection part 120 can use, as the specific time period, a time period that magnetic data from the magnetic data reading part 60 are not detected for specific milli-seconds or more. Further, the reading completion detection part 120 may use, as the specific time period, a time period that an output of binary data from the demodulation part 110 are not existed for specific milli-seconds or more, and/or a time period that a size (length) of magnetic data stored in the storage part 130 by the demodulation part 110 becomes a specific amount defined for a magnetic stripe 2a of one card or more.

[Structure of Encryption Control Part 62]

The encryption control part 62 is a circuit such as a CPU or an MPU independently provided in the encryption magnetic head 6 for executing processing of decoding of the binary data described above and the like. The encryption control part 62 encrypts the demodulated signal by a predetermined encryption function and key data to generate an encrypted signal. In other words, the encryption control part 62 in this embodiment is an encryption electronic component which encrypts the demodulated signal to generate an encrypted signal. In this embodiment, the encrypted signal is an encrypted character code as described below.

Further, the encryption control part 62 includes the storage part 130, a decode part 140, an encryption processing part 150, a determination part 160 and a notification part 170.

The storage part 130 is a RAM, a ROM, a flash memory and the like, and for example, may be structured as an incorporated memory of the encryption control part 62. The RAM of the storage part 130 stores various buffers described below and key data required for encryption. The ROM of the storage part 130 stores a control program (not shown) for the encryption control part 62.

Further, the storage part 130 secures areas of a first buffer 200, a second buffer 210 and a third buffer 220 as the buffer. Further, the storage part 130 stores an encrypted key 230.

The first buffer 200 stores demodulation data in an unedited state which are read by the magnetic data reading part 60 and demodulated by the demodulation IC 61. In this embodiment, specifically, the first buffer 200 stores data which are read and demodulated at the time of insertion and ejection of a card 2. More specifically, the first buffer 200 stores binary data which are a demodulated signal obtained by demodulating a magnetic signal having been read at the time of insertion of a card 2 by the demodulation part 110 (hereinafter, referred to as "insertion time magnetic data"). Further, the first buffer 200 also stores binary data which are a demodulated signal obtained by demodulating a magnetic signal having been read at the time of pulling-out (ejection) of the card 2 by the demodulation part 110 (hereinafter, referred to as "ejection time magnetic data").

The second buffer 210 stores the insertion time magnetic data or the pulling-out time magnetic data of a card 2, and data obtained by decoding the insertion time magnetic data having been demodulated. In this embodiment, the second buffer 210 stores the insertion time magnetic data before decoded and character code data obtained by decoding the insertion time magnetic data by the decode part 140.

The third buffer 220 stores data which are obtained by decoding demodulated data having been read at the time of insertion or ejection of the medium and demodulated. In this embodiment, the third buffer 220 stores character code data obtained by decoding the ejection time magnetic data by the decode part 140.

In this embodiment, when compared with a size of the demodulated binary data, a size of decoded character code data becomes larger. Therefore, a size of an area of the first buffer 200 may be set smaller than that of a decoded character code. Further, a size of an area of the first buffer 200 may be set so as to be capable of storing both the insertion time magnetic data and the ejection time magnetic data, or the size may be set in a degree so that only either one is overwritten and stored. On the other hand, in this embodiment, the second buffer 210 and the third buffer 220 have the same size and may be set in a size capable of storing a decoded character code. Further, the second buffer 210 may store the ejection time magnetic data and a character code obtained by decoding the ejection time magnetic data. In this case, the third buffer 220 may store the insertion time magnetic data and a character code obtained by decoding the insertion time magnetic data.

The encryption key 230 is, for example, key data including a public key and a secret key for encrypting magnetic data and transmitting and receiving them to and from the main control part 12.

The decode part 140 divides binary data demodulated by the demodulation part 110 into a predetermined bit string one character by one character and decodes to a bit string by referring to a character code table. More specifically, the binary data are stored in the first buffer 200 and thus, when decode processing is to be performed, the decode part 140 reads out the binary data stored in the first buffer 200 to execute decode processing. In this case, the decode part 140 may also calculate a check cord of the binary data and the like. Further, the decode part 140 may be realized by executing software by the encryption control part 62.

The decode part 140 decodes binary data stored in the first buffer 200 after pulling-out of a card 2 is detected by the reading completion detection part 120, and the decoded data (character code) is stored in either of the second buffer 210 and the third buffering 220. In this case, the decode part 140 processes a signal corresponding to, for example, the JIS I-type, II-type, or ISO/IEC standard. In this embodiment, the decode part 140 stores a decoded character code of the insertion time magnetic data in the second buffer 210. Further, the decode part 140 stores a decoded character code of the ejection time magnetic data in the third buffer 220.

The encryption processing part 150 performs encryption and decoding by using the encryption key 230. The encryption processing part 150 is a circuit which encrypts data having been decoded by the decode part 140 to transmits them to the main control part 12. Further, the encryption processing part 150 exchanges the encryption key 230 with the main control part 12 after pulling-out of a card 2 is detected by the reading completion detection part 120 to store in the storage part 130. The encryption processing part 150 reads out the character code of the insertion time magnetic data which is decoded by the decode part 140 and temporarily stored in the second buffer 210 of the storage part 130, and/or the character code of the ejection time magnetic data which is decoded by the decode part 140 and temporarily stored in the third buffer 220 to encrypt by the exchanged encryption key 230. The encrypted data are the "encrypted magnetic data" which are transmitted to the host control part 20 by the main control part 12.

The determination part 160 performs reading of magnetic data recorded on a card 2, determines presence/absence of an error of a reading result of both magnetic data at the time of insertion and pulling-out (ejection) and, in a case that there is no error, in other words, when not abnormal (no error), determines that the reading results are normal. Specifically, the determination part 160 is capable of determining whether the stored content of the second buffer 210 where the insertion time magnetic data are stored and the stored content of the third buffer 220 where the ejection time magnetic data are stored have been read normally or not, and comparing with each other. Further, when either one has not been read normally, it may be structured that the decode part 140 compares the insertion time magnetic data with the ejection time magnetic data and the portion having been read normally is substituted. This substitution may be performed by totally substituting with either of the insertion time magnetic data and the ejection time magnetic data having been read normally, or a part of the data may be substituted.

The notification part 170 notifies the determination result of the determination part 160 to the main control part 12. Specifically, in a case that the determination part 160 has determined that the character code having been read and decoded has no error in the determination part 160, the notification part 170 transmits the character code of the second buffer 210 or the third buffering 220 to the main control part 12. In this case, the main control part 12 is capable of notifying the character code to the host apparatus based on the transmission of the notification part 170.

A combination of the demodulation part 110, the reading completion detection part 120, the decode part 140, the encryption processing part 150, the determination part 160 and the notification part 170 which are included in the demodulation IC 61 and the encryption control part 62 may be arbitrary according to circuit structures of the demodulation IC 61 and the encryption control part 62. The encryption control part 62 is capable of functioning as the decode part 140, the encryption processing part 150, the determination part 160 and the notification part 170 by executing a control program stored in the ROM of the temporary memory part 13.

[Card Reading Processing]

Next, card reading processing by the card reader 1 in accordance with an embodiment of the present invention will be described below with reference to FIG. 5 and FIG. 6A through FIG. 6E. Card reading processing in this embodiment is mainly processing from when a card 2 is manually inserted into the card insertion port 4 until the card 2 has been ejected (pulled out). Specifically, when the card reading processing in this embodiment is to be performed, a card 2 is manually inserted into the card insertion port 4 by a user and is stopped at a card stopping position on the rear side and, after that, the card 2 is ejected (pulled out). In this manner, a magnetic signal of the magnetic stripe 2a is read by the encryption magnetic head 6. Further, a situation that a card 2 is inserted and reached to the stopping position and a situation that the card 2 has been ejected are respectively detected by the front sensor 7 and the rear sensor 8 in the main control part 12 (FIG. 2).

The card reading processing in this embodiment is performed so that the respective parts of the encryption magnetic head 6 and the main control part 12 mainly execute a control program for the encryption control part 62 stored in the storage part 130 or a control program for the main control part 12 stored in the storage part 13 by cooperation with the respective parts and by using hardware resources. The details of the card reading processing will be described below step by step based on a flow chart shown in FIG. 5.

(Step S100)

First, the main control part 12 and the decode part 140 of the encryption control part 62 of the encryption magnetic head 6 perform card insertion start processing. The main control part 12 receives a command for a start of magnetic reading from the host control part 20 and waits for a start of insertion of a card 2. When the main control part 12 detects insertion of a card 2 based on a signal of the front sensor 7, the main control part 12 transmits a command for a start of card reading through a communication line. The decode part 140 receives the command for the start of card reading and makes the demodulation IC 61 start reading of a magnetic signal.

(Step S101)

Next, the demodulation part 110 of the demodulation IC 61 of the encryption magnetic head 6 performs insertion time magnetic data reading processing. After a magnetic signal from the magnetic data reading part 60 is detected, the demodulation part 110 reads the magnetic signal, starts encoding, and decodes to binary data. The binary data are mainly data recorded on one of magnetic data tracks of the magnetic stripe 2a of the card 2. The demodulation part 110 stores the binary data in the first buffer 200 of the storage part 130.

Figure 6A:
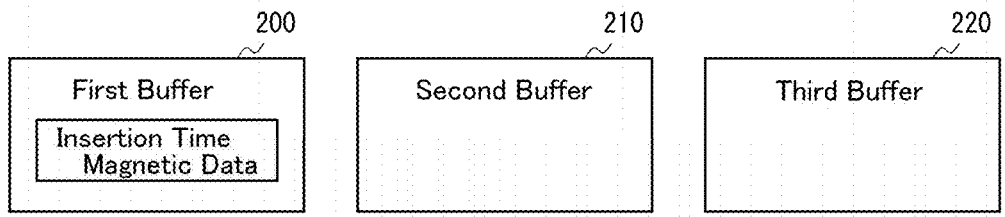
FIG. 6A through FIG. 6E are concept diagrams of buffer data in the card reading processing shown in FIG. 5.

As shown in FIG. 6A, insertion time magnetic data that are binary data having been read at the time of insertion and demodulated are stored in the first buffer 200 by this processing. At this time point, the second buffer 210 and the third buffer 220 are in empty states that no data are stored.

(Step S102)

Next, the reading completion detection part 120 of the demodulation IC 61 of the encryption magnetic head 6 determines whether reading of magnetic data is completed or not. The reading completion detection part 120 determines "Yes" when a magnetic signal from the magnetic data reading part 60 is no longer detected, when completion of reading of binary data is detected from the demodulation part 110 and/or, when a size (volume) of binary data becomes a predetermined amount or more. In other cases, the reading completion detection part 120 determines "No". In the case of "Yes", the reading completion detection part 120 advances processing to the step S103. In this case, the encryption control part 62 becomes a standby state. Therefore, a stored content of the first buffer 200 in the storage part 130 becomes a temporarily stored state. In the case of "No", the reading completion detection part 120 returns processing to the step S101. As a result, reading of magnetic data is continued.

(Step S103)

When reading of magnetic data is completed, the main control part 12 and the decode part 140 of the encryption control part 62 of the encryption magnetic head 6 perform card ejection start processing. When the main control part 12 detects ejection of the card 2 based on a signal of the rear sensor 8, the main control part 12 transmits a command for a start of card reading at the time of ejection through a communication line. The decode part 140 receives the command for the start of card reading and makes the demodulation IC 61 start reading of a magnetic signal.

Figure 6B:
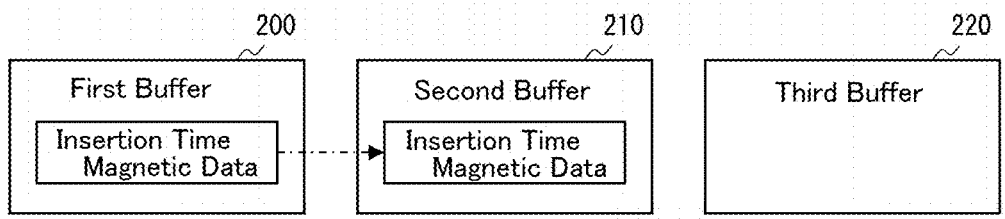

As shown in FIG. 6B, the decode part 140 copies the binary data stored in the first buffer 200 into the second buffer 210. In other words, as described above, the binary data having been read at the time of insertion and demodulated are stored in the first buffer 200. When the binary data are copied, the data having been stored in the first buffer 200 are stored in the second buffer 210. As a result, the second buffer 210 stores the same data as the binary data having been read at the time of insertion and demodulated. At this time point, the third buffer 220 is in an empty state that no data are stored.

(Step S104)

Figure 6C:
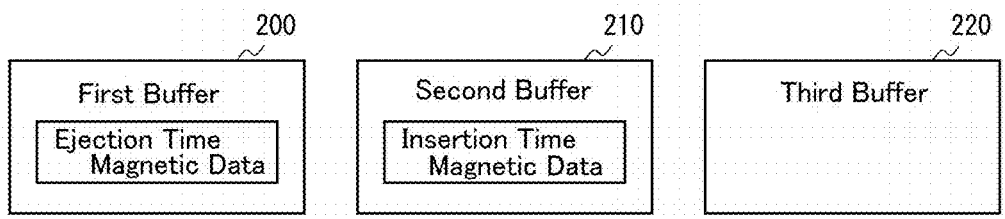

Next, the demodulation part 110 of the demodulation IC 61 of the encryption magnetic head 6 performs the ejection time magnetic data reading processing. After a magnetic signal is detected, the demodulation part 110 reads the magnetic signal, starts encoding, and stores binary data in the first buffer 200 of the storage part 130. As shown in FIG. 6C, in this case, in this embodiment, the ejection time magnetic data that are the binary data newly read at the time of pulling-out (ejection) and demodulated are overwritten and stored in the first buffer 200. At this time point, the insertion time magnetic data which are the binary data having been read at the time of insertion and demodulated are still stored in the second buffer 210. Further, the third buffer 220 is still in an empty state that no data are stored. In this case, the demodulation part 110 may store the ejection time magnetic data in the first buffer 200 in an inverse order to the insertion time magnetic data in an address space of the storage part 130. As a result, the arranging order of the final data is similar to that of the second buffer 210 and comparison is easily performed.

(Step S105)

Next, the reading completion detection part 120 of the demodulation IC 61 of the encryption magnetic head 6 determines whether reading of magnetic data is completed or not. This processing is similar to the step S102, and the reading completion detection part 120 determines "Yes" when completion of reading of magnetic data is detected. In other cases, the reading completion detection part 120 determines "No". In the case of "Yes", the reading completion detection part 120 advances processing to the step S106. In the case of "No", the reading completion detection part 120 returns processing to the step S104 and reading of magnetic data is continued.

(Step S106)

Figure 6D:
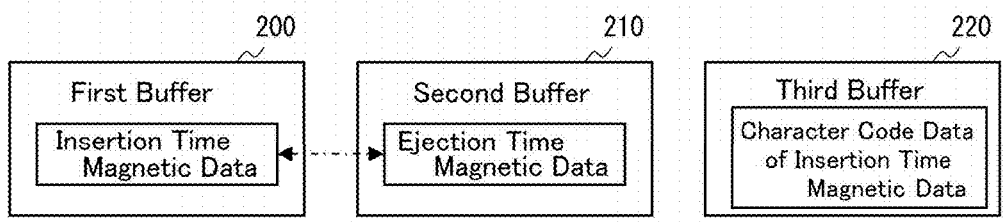

When reading of magnetic data is completed, at this time point, the ejection time magnetic data which are the binary data having been read at the time of ejection and demodulated are overwritten and stored in the first buffer 200. Further, the insertion time magnetic data which are the binary data having been read at the time of insertion and demodulated are stored in the second buffer 210 as they are. In this embodiment, the magnetic data of the first buffer 200 and the magnetic data of the second buffer 210 are exchanged with each other, and the main control part 12 and the decode part 140 of the encryption control part 62 of the encryption magnetic head 6 perform insertion time demodulation data decode processing. The decode part 140 determines that ejection of a card 2 is completed when reading of magnetic data is completed and starts decoding for the first buffer 200. As shown in FIG. 6D, the decode part 140 decodes the insertion time magnetic data which are the binary data of the first buffer 200 and temporarily stores the decoded character code in the third buffer 220.

(Step S107)

Figure 6E:
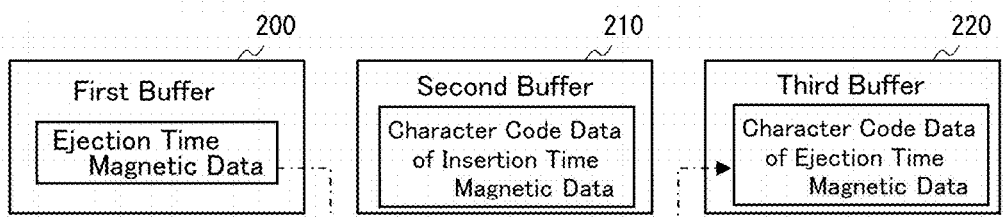

Next, the decode part 140 performs ejection time demodulation data decode processing. The decode part 140 also assumes that the ejection of the card 2 is completed and decodes the ejection time magnetic data. Before the decode processing is started, the ejection time data of the second buffer 210 are overwritten in the first buffer 200 and the decoded insertion time magnetic data of the third buffer 220 are overwritten in the second buffer 210. At this time point, the ejection time magnetic data which are the binary data having been read at the time of ejection and demodulated are stored in the first buffer 200. As shown in FIG. 6E, the decode part 140 decodes the ejection time magnetic data having been read at the time of ejection and demodulated and stored in the first buffer 200 and stores the decoded character code in the third buffer 220. In this case, the decoded character code of the binary data having been read at the time of insertion and demodulated is stored in the second buffer 210.

(Step S108)

Next, the determination part 160 determines whether the reading is normally performed or not. The determination part 160 checks the decoded character code of the ejection time magnetic data and determines whether the reading is normally performed or not. In this case, the determination part 160 may determine by using a check cord or the like. The determination part 160 determines "Yes" when the character code of the ejection time magnetic data is normal. The determination part 160 determines "No" when the character code of the ejection time magnetic data is not normal. In the case of "Yes", the determination part 160 advances the processing to the step S110. In the case of "No", the determination part 160 advances the processing to the step S109.

(Step S109)

In a case that the character code of the ejection time magnetic data is not normal, the determination part 160 performs normal portion substituting processing. The determination part 160 compares the character code of the insertion time magnetic data with the character code of the ejection time magnetic data and substitutes the portion which has been read normally. The determination part 160 performs, for example, the substitution by entirely substituting with the character code of the insertion time magnetic data having been read normally. Specifically, the determination part 160 checks the character code of the insertion time magnetic data and determines whether the reading has been performed normally or not. In this case, the determination part 160 may check a checksum, a hash value or the like. Further, for example, when the reading is normally performed, the determination part 160 passes a pointer or the like of the second buffer where the character code of the insertion time magnetic data is stored to the encryption processing part 150 for substitution. In other words, in a case that the character code of the ejection time magnetic data is not normal and that the character code of the insertion time magnetic data is normal, the character code of the insertion time magnetic data is used as a reading result.

In a case that both the character code of the insertion time magnetic data and the character code of the ejection time magnetic data are not normal, the determination part 160 may substitute for a part of the character code of the insertion time magnetic data and a part of the character code of the ejection time magnetic data. In this case, the determination part 160 compares similarity between the character code of the insertion time magnetic data and the character code of the ejection time magnetic data, aligns (alignment) by a dynamic programming method or the like, divides at a plurality of positions, and stores in the storage part 130 as data of a new character code. In this case, the determination part 160 may confirm whether the check cord or the like is normal or not for respective combinations. When the check cord becomes normal in either combination, for example, the determination part 160 passes the pointer or the like of "the data of the new character code" which is the normal combination to the encryption processing part 150 for substitution. In this manner, the portion having been read normally can be substituted.

After that, the respective parts of the encryption magnetic head 6 wait until a command from the main control part 12 is received. In this embodiment, the notification part 170 may notify an error to the main control part 12 in a case that both the character code of the insertion time magnetic data and the character code of the ejection time magnetic data are not normal and that the check cord or the like is not normal in any combination, or the like.

(Step S110)

In this step, the main control part 12 and the encryption processing part 150 and the notification part 170 of the encryption control part 62 of the encryption magnetic head 6 perform encryption key exchange encryption transmission processing. The main control part 12 exchanges the encryption key 230 with the encryption control part 62 through a communication line at a specific timing when data encryption and decoding processing are required. The encryption processing part 150 encrypts the character code having been normally read and substituted based on the processing described above by using the encryption key 230. Further, the notification part 170 transmits the encrypted character code (encrypted signal) to the main control part 12 through the communication line. After that, the main control part 12 transmits the encrypted character code (encrypted signal) having been received to the host control part 20. In this manner, the card reading processing in accordance with the embodiment of the present invention is finished.

[Principal Effects in this Embodiment]

The card reader 1 in accordance with an embodiment of the present invention is a magnetic data processing device in which a card 2 on which magnetic data are recorded is manually operated by a user, and the magnetic data are read when the card 2 is inserted into the inside of the card reader 1 or, when the inserted card 2 is ejected from the card reader 1. In addition, the card reader 1 includes the encryption magnetic head 6 for reading magnetic data recorded on the card 2. Further, the encryption magnetic head 6 includes the magnetic data reading part 60 structured to read magnetic data of the card 2 to output an analog output signal, the demodulation IC 61 structured to demodulate the analog output signal outputted from the magnetic data reading part 60 to generate a digital demodulated signal, and the encryption control part 62 structured to generate an encrypted signal obtained by encrypting the demodulated signal demodulated by the demodulation IC 61. Further, the encryption control part 62 includes the first buffer 200, the second buffer 210 and the third buffer 220 in which data having been read at the time of insertion and ejection of the card 2 are stored. When structured as described above, since the encryption control part 62 is independently provided from the main control part 12, data having been read at the time of insertion and ejection of the card 2 are stored in the respective buffers in the inside of the encryption magnetic head 6 having a structure that a swindle (tapping) of data is difficult, and thus security can be secured. In addition, the data stored in the respective buffers are performed with decode processing while taking a timing of an inserting operation or a pulling-out operation. As a result, even in a structure using the encryption magnetic head 6, an inserting and pulling-out operation can be performed quickly compared with the conventional and thus, both high security performance and high reading performance can be attained.

Further, the card reader 1 in this embodiment, the magnetic data having been read are stored in the second buffer 210 of the storage part 130 of the encryption magnetic head 6 which cannot be read from the outside and thereby security can be secured and both security and reading performance can be also attained as described above.

In addition, in the card reader 1 in accordance with an embodiment of the present invention, the storage part 130 also temporarily stores the insertion time magnetic data obtained by decoding the magnetic signal having been read at the time of pulling-out of a card 2 by the demodulation part 110, and the decode part 140 also decodes the ejection time magnetic data after pulling-out of the card 2. Furthermore, the determination part 160 compares the character code of the insertion time magnetic data with the ejection time magnetic data obtained by decoding the character code of the ejection time magnetic data and the portion having been read normally is substituted. According to this structure, the ejection time magnetic data can be also compared by decoding the magnetic data after the card 2 is pulled out. As a result, the insertion time magnetic data and the ejection time magnetic data are substantially simultaneously prepared and bidirectional data comparison can be performed. Therefore, reading performance can be improved.

The card reader 1 in accordance with an embodiment of the present invention includes the reading completion detection part 120 which autonomously detects completion of reading of a magnetic signal at the time of insertion of a card 2 and at the time of pulling-out of the card 2, and the decode part 140 decodes the insertion time magnetic data stored in the storage part 130 after pulling-out of the card 2 is detected by the reading completion detection part 120. According to this structure, after pulling-out of a card 2 is autonomously detected by the encryption magnetic head 6, the magnetic data at the time of insertion can be immediately decoded. As a result, the insertion time magnetic data can be acquired at a timing before the main control part 12 detects pulling-out of a card 2 from a signal of the front sensor 7, and a delay time until a start of reading at the time of pulling-out, a delay time when the encryption key 230 is exchanged with the main control part 12, and the like can be reduced.

Other Embodiments

In the embodiment described above, the decode processing of the demodulation data at the time of insertion and the decode processing of the demodulation data at the time of pulling-out are started in the encryption magnetic head 6 in response to an instruction from the main control part 12. However, it may be structured that all or one of the magnetic data reading processing at the time of insertion, the magnetic data reading processing at the time of ejection, the demodulation data decode processing at the time of insertion, and the demodulation data decode processing at the time of pulling-out autonomously starts in the encryption magnetic head 6 based on the detection of completion of reading of magnetic data by the reading completion detection part 120. Further, in this case, the demodulation IC 61 or the encryption control part 62 may command starts of these processings to the main control part 12 through a communication line. According to this structure, even when tampering is applied to the front sensor 7 or the rear sensor 8, decoding can be executed and reading reliability is improved and security can be improved.

Further, in the embodiment described above, the character code of magnetic data at the time of insertion and the character code of magnetic data at the time of ejection are compared with each other. However, it may be structured that respective binary data before decoded are compared with each other and, when they are the same as each other, either is decoded. According to this structure, time and labor for respectively calculating the check cords or the like of the magnetic data at the time of insertion and the magnetic data at the time of ejection are reduced and thus, processing can be performed further quickly compared with the conventional.

Further, in the embodiment described above, the present invention is applied to a so-called dip type manually operated card reader 1 as an example. However, the present invention may be applied to a manual type card reader, for example, a so-called swipe type card reader in which magnetic data of a card are read while moving the card along a groove-shaped card passage formed shallower than a shorter-side width of the card. In addition, the present invention may be applied to a card conveyance type card reader including a card conveyance mechanism structured to convey a card by a drive part such as a motor. Further, the present invention may be applied to a card reader in which an IC card is read and written. When structured as described above, security and reading reliability of a manual type card reader, a card conveyance type card reader and the like can be improved.

Although the present invention has been shown and described with reference to a specific embodiment, various changes and modifications will be apparent to those skilled in the art from the teachings herein.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A magnetic data processing device in which a medium recorded with magnetic data is manually operated by a user, and the magnetic data are read when the medium is inserted into an inside of the device or, when the medium having been inserted is ejected from the device, the magnetic data processing device comprising:
    an encryption magnetic head structured to read the magnetic data recorded on the medium;
    wherein the encryption magnetic head comprises:
        a magnetic data reading part structured to read the magnetic data of the medium to output an analog output signal;
        a demodulation electronic component structured to demodulate the analog output signal outputted from the magnetic data reading part to generate a digital demodulated signal; and an encryption electronic component structured to generate an encrypted signal obtained by encrypting the demodulated signal demodulated by the demodulation electronic component; and wherein the encryption electronic component comprises at least a first buffer, a second buffer and a third buffer structured to store data having been read at an insertion time and an ejection time of the medium.

2. The magnetic data processing device according to claim 1, wherein the encryption electronic component comprises:

the first buffer, which is structured to store data having been read at the insertion time and the ejection time of the medium and demodulated;

the second buffer, which is structured to store data obtained by decoding the data having been read either at the insertion time or the ejection time of the medium and demodulated; and the third buffer, which is structured to store data obtained by decoding the data having been read either at the insertion time or the ejection time of the medium and demodulated and other than the data stored in the second buffer.

3. A magnetic data processing method executed by a magnetic data processing device in which a medium recorded with magnetic data is manually operated by a user, and the magnetic data are read when the medium is inserted into an inside of the device or, when the medium having been inserted is ejected from the device, the magnetic data processing device comprising an encryption magnetic head structured to read the magnetic data recorded on the medium, the magnetic data processing method comprising:

reading, with the encryption magnetic head, the magnetic data of the medium and outputting an analog output signal;

demodulating the analog output signal having been outputted and generating a digital demodulated signal;

storing the digital demodulated signal having been read at an insertion time of the medium in a second buffer and storing the digital demodulated signal having been read at an ejection time in a first buffer;

storing the digital demodulated signal having been read at the insertion time of the medium in the second buffer;

decoding the demodulated signal having been demodulated;

storing decoded data of the demodulated signal having been read at the insertion time of the medium in the second buffer; and storing decoded data of the demodulated signal having been read at the ejection time of the medium in a third buffer.

* * * * *